UNITED STATES PATENT OFFICE.

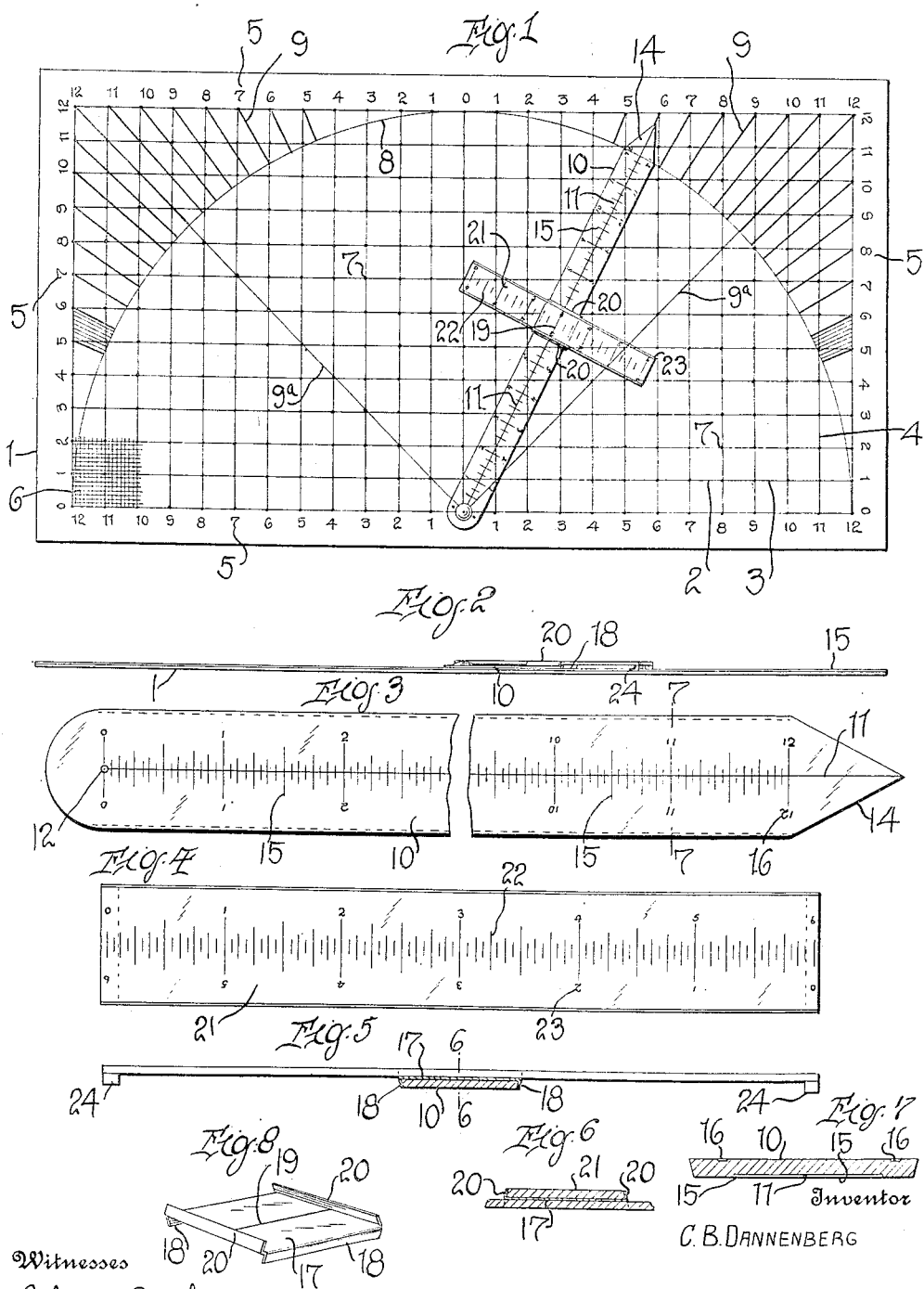

CHARLES B. DANNENBERG, OF WILMINGTON, DELAWARE.

PROTRACTOR.

1,133,540.

Specification of Letters Patent. Patented Mar. 30, 1915.

Application filed June 13, 1914. Serial No. 844,974.

*To all whom it may concern:*

Be it known that I, CHARLES B. DANNENBERG, a citizen of the United States, residing at Wilmington, in the county of New Castle and State of Delaware, have invented certain new and useful Improvements in Protractors, of which the following is a specification, reference being had to the accompanying drawings.

This invention relates to certain improvements in protractors; and the object of the invention is to provide a novel and improved device of this general character whereby the desired results may be attained with convenience and economy.

The invention consists in the details of construction and in the combination and arrangement of the several parts of my improved protractor whereby certain important advatages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 9:
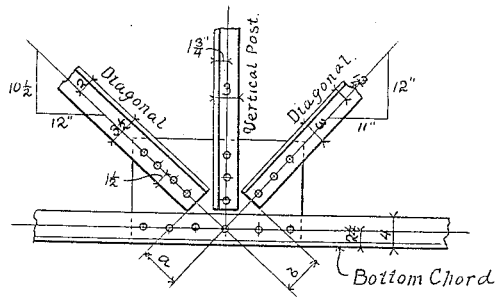
Figure 10:
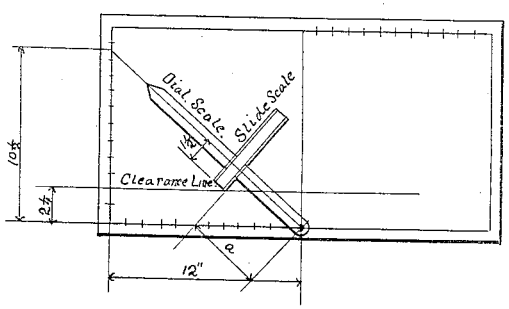
Figure 11:
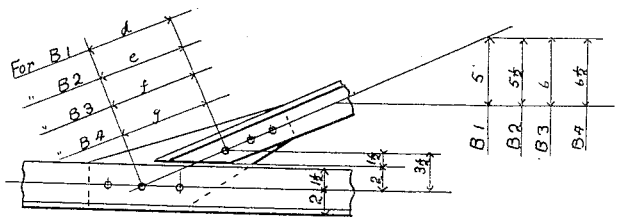

Figure 1 is a plan view of a protractor constructed in accordance with an embodiment of my invention, certain of the lead lines being shown in fragment in order to avoid confusion; Fig. 2 is an edge view of the device as herein embodied; Fig. 3 is an enlarged view in plan of the index herein embodied; Fig. 4 is an enlarged view in plan of the slide scale; Fig. 5 is a view, partly in elevation and partly in section, of the assembled index and slide scale; Fig. 6 is a sectional view taken substantially on the line 6—6 of Fig. 5; Fig. 7 is a sectional view, on an enlarged scale, taken substantially on the line 7—7 of Fig. 3; Fig. 8 is a view in perspective of the connecting plate herein included; Fig. 9 is a fragmentary view of a truss structure, in the laying-out of which my improved device is adapted to be employed; Fig. 10 is a somewhat diagrammatic view of my improved device, illustrating the use of the same; and Fig. 11 is a diagrammatic view illustrating a further example of the usages of my invention.

As disclosed in the accompanying drawings, 1 denotes a body formed preferably of damp proof bristol board and having outlined thereon the field 2 of rectangular formation and, as herein embodied, the longitudinal dimension is twenty-four inches and the transverse dimension twelve inches. The field is divided by the longitudinal and transverse lines 3 and 4, respectively, into square inch blocks, the opposite extremities of such lines having positioned in proximity thereto the scale indications 5, the indications along the transverse sides of the field extending forwardly in sequence from the inner longitudinal edge of the field while the indications along the longitudinal edges of the field are arranged in sequence in opposite directions from the longitudinal center of the field. Each of the square inch blocks is divided by the perpendicularly related lines 6 into sixty-four parts and in order that the intersection of the lines 3 and 4 may be readily discerned in order to expedite the reading of the indicator, I have such points of intersection emphasized by the heavy dots 7.

Disposed longitudinally of the field is a semi-circular line 8 described around the longitudinal center of the inner edge of the field and of a twelve inch radius and radiating from the longitudinal center of the lower edge of the field from the line 8 to the adjacent edges of the field are the heavy lines 9, the outer extremities of which being spaced apart a distance of one inch. The radial line 9, terminating at the forward corners of the field, is extended inwardly, as indicated at 9ª, to the longitudinal center of the inner edge of the field.

Pivotally engaged with the member 1 at the longitudinal center of the lower edge of the field is the index member 10 formed of transparent material, preferably celluloid and having cut in its under surface, longitudinally thereof, at its transverse center the line 11 leading from the pivot hole 12 produced in the index to the apex of the pointed extremity 14. Also cut in the under surface of the index are the linear scale graduations 15, while on the upper surface of the index are cut the indications 16. The under surface of the index 10 is adapted to lie flat upon the member 1, and by having the longitudinal line 11 and the graduations 15 cut on the under surface thereof, it will be readily perceived that the index may coact with the field with absolute accuracy which would not be true if such line and graduations were produced upon the upper face of the index, for reasons which are believed to be clearly obvious to those skilled in the art to which my present invention appertains.

17 denotes a plate formed preferably of a white metal having its opposite margins flexed to afford the guides 18 whereby the same may be slidably engaged upon the index 10, and in the upper surface of said plate 17 is cut the line 19 which is adapted to be brought in alinement with the line 11, hereinbefore referred to. The remaining marginal portions of the plate, which is substantially square in plan, are flexed in a direction opposite to the direction of the guides 18 and serve to afford guides 20 for the slide scale 21 also formed of a transparent material, such as celluloid, and having cut on the top face thereof the linear graduations 22 and the indications 23, and it is to be observed that the indications on opposite sides of the graduations are reversely directed. It is to be understood that the guides 18 and 20 are such as to maintain the slide scale 21 perpendicular to the index 10. To the opposite extremities of the slide scale 21 are affixed the transverse wear strips 24 which are adapted to contact with the member 1 and to compensate for the thickness of the index 10 in order that no inaccuracy of indication may result. In order to prevent wear, the member 1 may be covered with a sheet 15 of transparent material, such as celluloid.

While my improved protractor may be employed in connection with different characters of work, I have found it especially applicable in connection with iron structural work, and it reduces to a minimum the time required in laying-out the work by the draftsman, as with my device the necessity of making a large scale lay-out of the joints is avoided as the necessary clearances may be readily and accurately plotted by my protractor as herein set forth. An example of a lay-out is shown in Fig. 9 wherein it is required to compute the distances $a$ and $b$ in order that the diagonals and gusset plates may be detailed so that when assembled the diagonals will clear the bottom chords and the vertical post. With my improved device to determine the distances $a$ and $b$, first set the index member or dial scale to the required slope of the diagonals (see Fig. 10) and then move the slide scale 21 across the dial until the lower corner of the slide scale represents a corner of the diagonal, with such corner at the clearance line, the distances $a$ and $b$ can then be read in full size. It is obvious that the index member or dial scale can be set at any bevel and the slide scale moved across to represent any edge distance on the diagonal members. Therefore if the drawing is out of scale, the device proves itself more valuable than before.

In Fig. 11 is set forth a sample of combining sketches or, in other words, making one sketch do for several braces. As is believed to be self-evident, it is only necessary to set the dial scale or index member to any of the bevels given and where the dial scale or index member crosses the horizontal line 3½ inches up from the bottom read through the index member or dial scale the diagonal distances $d$, $e$, $f$ and $g$, as is believed to be clearly apparent to those skilled in the art to which my present invention appertains.

While my invention may be employed for different other purposes, I wish to call attention to the fact that it is especially applicable in reducing slopes to a certain bevel per foot. If you had a right triangle, 6 feet base and 8 feet altitude, and wish to reduce the slope to so much per foot so that the templet maker might more readily lay-out his work on the bench, it is only necessary to plot the distances 6 feet off horizontal and the 8 feet vertical above it and swing the center line of the index line or dial scale over the point, the index member then pointing to the required bevel per foot.

From the foregoing description, it is thought to be obvious that an indicator constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a member divided into a plurality of blocks, a transparent index pivotally engaged with the member midway of a margin thereof and provided with graduations, and a transparent slide scale provided with graduations carried by the index and movable at right angles thereto.

2. A device of the character described comprising a member divided into a plurality of blocks, a transparent index pivotally engaged with the member midway of a margin thereof and provided with graduations, a transparent slide scale provided with graduations carried by the index and movable at right angles thereto, said member being provided with a plurality of radial lines with the pivotal point of the index as their common center.

3. A device of the character described comprising a member divided into a plurality of blocks, a transparent index pivotally engaged with the member midway of the inner edge and provided with graduations, a transparent slide scale provided with graduations carried by the index and movable at right angles thereto, said member being provided with a segmental line described about the pivotal point of the index as a center and with lines radiating from the segmental line.

4. A device of the character described comprising a member divided into a plurality of blocks, an index pivotally engaged with the member midway a margin thereof and provided with graduations, and a slide scale provided with graduations carried by the index and movable at right angles thereto.

In testimony whereof I hereunto affix my signature in the presence of two witnesses.

CHARLES B. DANNENBERG.

Witnesses:
 WM. L. TODD,
 JAS. L. TODD.